US009049570B2

(12) United States Patent
Zhang et al.

(10) Patent No.: US 9,049,570 B2
(45) Date of Patent: Jun. 2, 2015

(54) METHOD AND APPARATUS FOR REGISTRATION, COMMUNICATION AND HANDOVER OF MOBILE NODE

(75) Inventors: Gong Zhang, Shenzhen (CN); Lujia Pan, Shenzhen (CN); Dayang Feng, Shenzhen (CN); Cheng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1199 days.

(21) Appl. No.: 12/973,706

(22) Filed: Dec. 20, 2010

(65) Prior Publication Data

US 2011/0090868 A1   Apr. 21, 2011

Related U.S. Application Data

(63) Continuation of application No. PCT/CN2009/072273, filed on Jun. 15, 2009.

(30) Foreign Application Priority Data

Jul. 4, 2008   (CN) .......................... 2008 1 0136023

(51) Int. Cl.
*H04W 8/12*     (2009.01)
*H04W 36/00*    (2009.01)
*H04W 80/04*    (2009.01)

(52) U.S. Cl.
CPC ............ *H04W 8/12* (2013.01); *H04W 36/0011* (2013.01); *H04W 80/04* (2013.01)

(58) Field of Classification Search
None
See application file for complete search history.

(56) References Cited

U.S. PATENT DOCUMENTS

| 2002/0133607 A1* | 9/2002 | Nikander .................. 709/229 |
| 2004/0181559 A1 | 9/2004 | Lee et al. |
| 2006/0018299 A1* | 1/2006 | Yamamoto .................. 370/349 |

(Continued)

FOREIGN PATENT DOCUMENTS

| CN | 1543612 A | 11/2004 |
| CN | 1640074 A | 7/2005 |

(Continued)

OTHER PUBLICATIONS

Written Opinion of the International Searching Authority dated Sep. 24, 2009 in connection with International Patent Application No. PCT/CN2009/072273.

(Continued)

*Primary Examiner* — Alex Skripnikov

(57) ABSTRACT

The present invention relates to mobile communication technologies, and discloses a method and an apparatus for registration, communication, and handover of a Mobile Node (MN). The present invention is intended to overcome the bottlenecks of data traffic and processing capability in the home network in the prior art. A distributed mobility management system is provided herein. The system includes at least two Mobility Management Anchors (MMAs): any two MMAs are interconnected; at least one terminal exists in each MMA connection; each MMA stores a terminal binding relationship table; and the terminal binding relationship table records identifiers (IDs) and Internet Protocol (IP) addresses of terminals. The distributed mobility management system under the present invention can balance load, improve the data processing capability, simplify the signaling interaction in various procedures, and improve the system processing capability.

9 Claims, 18 Drawing Sheets

(56) References Cited

U.S. PATENT DOCUMENTS

2006/0218283 A1 9/2006 Jones et al.
2007/0217363 A1 9/2007 Ue et al.

FOREIGN PATENT DOCUMENTS

| CN | 1642348 A | 7/2005 |
| CN | 1643853 A | 7/2005 |
| CN | 1832520 A | 9/2006 |
| CN | 1893394 A | 1/2007 |
| CN | 1947441 A | 4/2007 |
| CN | 101179602 A | 5/2008 |

OTHER PUBLICATIONS

Translation of Office Action dated Jan. 13, 2011 in connection with Chinese Patent Application No. 200810136023.X.

Partial translation of Office Action dated Feb. 3, 2012 in connection with Chinese Patent Application No. 200810136023.X.

International Search Report dated Sep. 24, 2009 in connection with International Patent Application No. PCT/CN2009/072273.

\* cited by examiner

METHOD AND APPARATUS FOR REGISTRATION, COMMUNICATION AND HANDOVER OF MOBILE NODE

CROSS-REFERENCE TO RELATED APPLICATIONS

This application is a continuation of International Application No. PCT/CN2009/072273, filed on Jun. 15, 2009, which claims priority to Chinese Patent Application No. 200810136023.X, filed on Jul. 4, 2008, both of which are hereby incorporated by reference in their entireties.

TECHNICAL FIELD

The present invention relates to mobile communications technologies, and in particular, to a method and an apparatus for registration, communication, and handover of a Mobile Node (MN).

BACKGROUND

Mobile Internet Protocol (MIP) supports connectivity when an MN moves in an IP network so that the MN can still keep connection to the network after leaving the home network. The location of an MN is always identified by a Home Address (HoA) allocated by the home network, and the identifier of the location of the MN does not change with a visited network. After the MN leaves the home network, the MN is correlated with a Care Of Address (CoA) allocated by the visited network, and the current location of the MN is identified by the CoA, and the MN sends the current location information to a Home Agent (HA). The HA intercepts the packets sent by a Corresponding Node (CN) to the HoA of the MN, and forwards the packets to the CoA of the MN through a tunnel. The processing occurs on the IP layer completely, and is transparent to all layers above the IP layer.

Two basic protocols of the MIP protocol are Mobile IPv4 (MIPv4) and Mobile IPv6 (MIPv6). The MIPv4/v6 protocol enables mobility of the traditional fixed Internet host.

In the process of implementing the present invention, the inventor finds at least the following problems in the prior art: With the HA being applied to the home network, a majority of the signaling and data passes through the HA, which makes the home network become a performance bottleneck. Although the service provider can perform optimization by using multiple HAs which support plenty of MNs, the home network is still a bottleneck of transmitting and processing data traffic. The HA needs to not only manage handover of all MNs, but also manage locations of the MNs, thus leading to complicated design and heavy load of the HA.

SUMMARY

The embodiments of the present invention provide a distributed mobility management system, and provide a method and an apparatus for registering, communicating with, and handing over an MN based on this system.

An MN registration method provided in an embodiment of the present invention includes:

by a Mobility Management Anchor (MMA), receiving an IP address obtaining request sent by an MN;

allocating an IP address to the MN and obtaining identifier information of the MN according to the IP address obtaining request sent by the MN; and binding the IP address of the MN to the identifier information according to the identifier information, where the identifier information is registered with a location management server through the MN.

An MN communication method provided in an embodiment of the present invention includes:

by an MMA, receiving a packet that carries an identifier (ID) of an MN from a CN;

querying a binding relationship of the MN according to the ID carried in the packet; and sending data in the packet that carries the ID to the MN according to the binding relationship of the MN.

A handover method based on a distributed mobility management system is provided in an embodiment of the present invention. The handover method includes:

moving, by an MN, from an area covered by a source network to an Adjacent Network (AN);

obtaining location information of the MN in the source network and routing information of the MN in the AN;

obtaining destination address configuration information of the MN in the AN according to the location information in the source network and the routing information in the AN; and configuring destination address information for the MN after the MN hands over from the source network to the AN.

An MN registration apparatus provided in an embodiment of the present invention includes:

a receiving unit, adapted for an MMA to receive an IP address obtaining request sent by an MN;

an allocating unit, adapted to allocate an IP address to the MN and obtain identifier information of the MN according to the IP address obtaining request sent by the MN; and a registering unit, adapted to bind the IP address of the MN to the identifier information according to the identifier information, where the identifier information is registered with a location management server through the MN.

An MN communication apparatus provided in an embodiment of the present invention includes:

a receiving unit, adapted for an MMA to receive a packet that carries an ID of an MN from a CN;

a binding relationship querying unit, adapted to query a binding relationship of the MN according to the ID carried in the packet; and a sending unit, adapted to send data in the packet that carries the ID to the MN according to the binding relation of the MN.

A handover apparatus based on a distributed mobility management system is provided in an embodiment of the present invention. The handover apparatus includes:

an information obtaining unit, adapted to obtain location information of an MN in a source network and routing information of the MN in an AN when the MN moves from an area covered by the source network to the AN;

an address configuration information obtaining unit, adapted to obtain destination address configuration information of the MN in the AN according to the location information in the source network and the routing information in the AN; and an address information configuring unit, adapted to configure destination address information for the MN after the MN hands over from the source network to the AN.

A distributed mobility management system provided in an embodiment of the present invention includes at least two MMAs; any two MMAs are interconnected; at least one terminal exists in each MMA connection; each MMA stores a terminal binding relationship table; and the terminal binding relationship table records IDs and IP addresses of terminals.

In the embodiments of the present invention, the MMA stores a binding relationship table, and the list stores the binding relationships between the MN identifier and the IP address allocated by the current network to the MN. In this way, the MN can communicate with the CN in the current network directly by using the IP address allocated by the current network. The data exchanged between the MN and the CN does not necessarily pass through the HA of the home network, but passes through the MMA of the current network directly. In the prior art, however, the data traffic is large in the home network and the processing capability is low, the HA design is complicated, and the load is heavy. By comparison, the distributed mobility management system in the embodiments of the present invention can balance load, improve the data processing capability, simplify the signaling interaction in various procedures, and improve the system processing capability.

DETAILED DESCRIPTION

The following describes a distributed mobility management system provided in an embodiment of the present invention, and a method and an apparatus for registration, communication, and handover of an MN based on this system with reference to the accompanying drawings.

Figure 1:
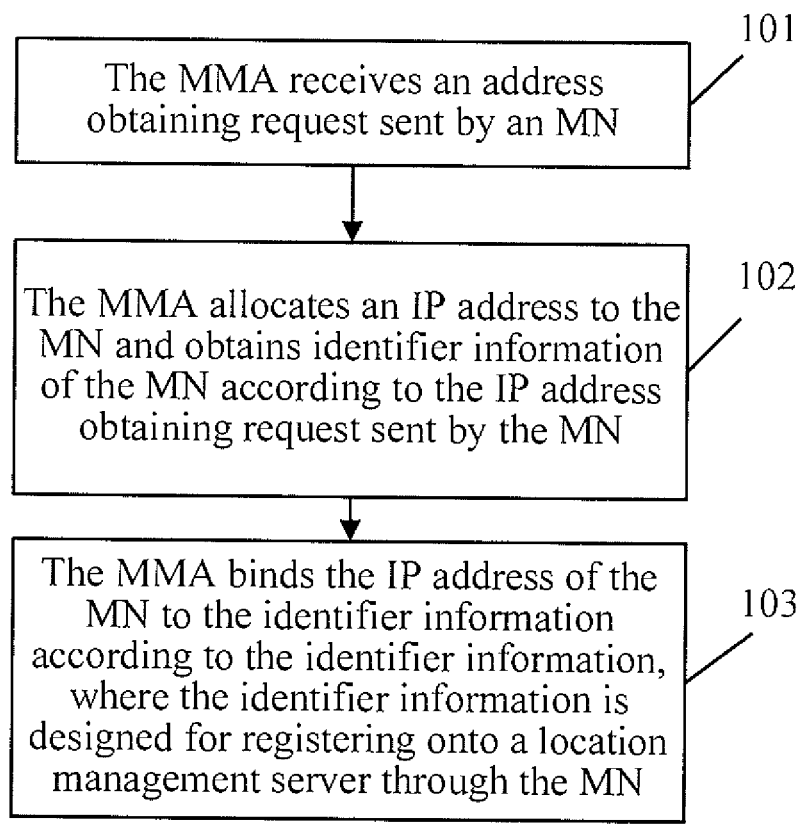
FIG. 1 is a flowchart of an MN registration method based on a distributed mobility management system in an embodiment of the present invention.

As shown in FIG. 1, an MN registration method is provided in an embodiment of the present invention. The method includes the following steps:

101. The MMA receives an IP address obtaining request sent by an MN.

102. The MMA allocates an IP address to the MN and obtains identifier information of the MN according to the IP address obtaining request sent by the MN.

103. The MMA binds the IP address of the MN to the identifier information according to the identifier information, where the identifier information is registered with a location management server through the MN.

Figure 2:
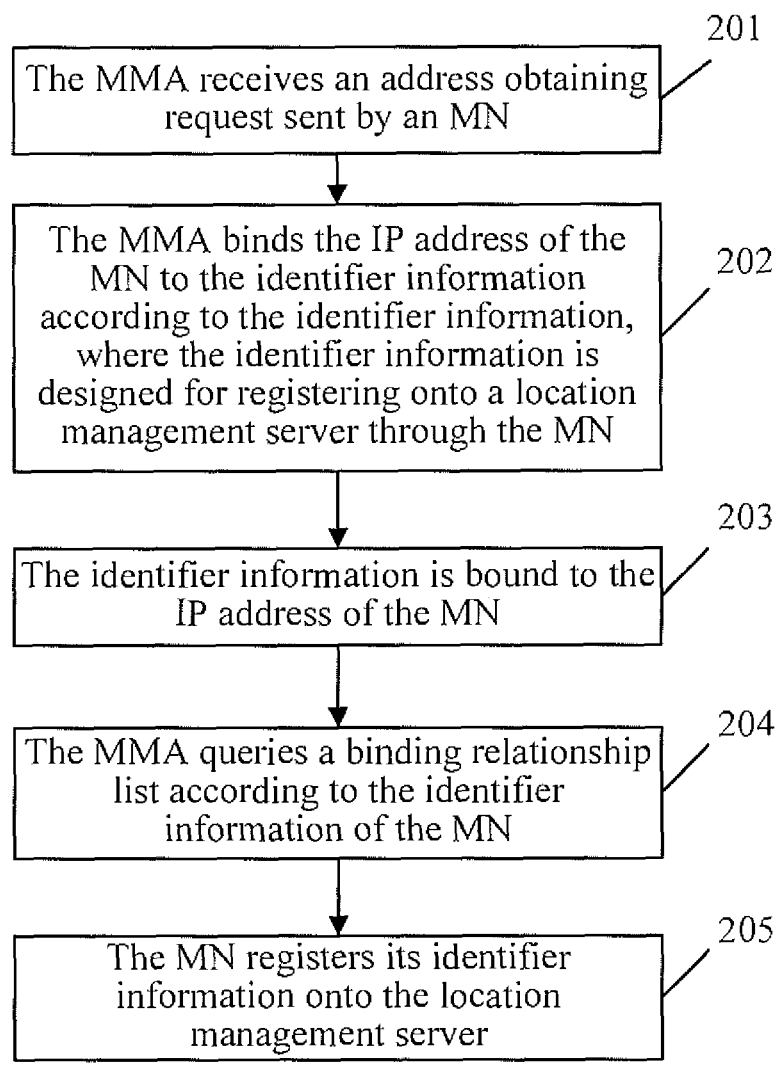
FIG. 2 is a flowchart of another MN registration method based on a distributed mobility management system in an embodiment of the present invention.

As shown in FIG. 2, another MN registration method is provided in an embodiment of the present invention. The method includes the following steps:

201. The MMA receives an IP address obtaining request sent by an MN.

202. The MMA allocates an IP address to the MN and obtains identifier information of the MN according to the IP address obtaining request sent by the MN.

203. The MMA binds the identifier information to the IP address of the MN.

204. The MMA queries the binding relationship table according to the identifier information of the MN.

If the identifier information of the MN exists in the binding relationship table, the MMA refreshes the binding relationship table according to the binding relationship between the IP address and the identifier information of the MN.

If the identifier information of the MN does not exist in the binding relationship table, the MMA inserts the binding relationship between the IP address and the identifier information of the MN into the binding relationship table.

205. The MN registers its identifier information with the location management server. The identifier information refers to the ID of the MN.

Figure 3:
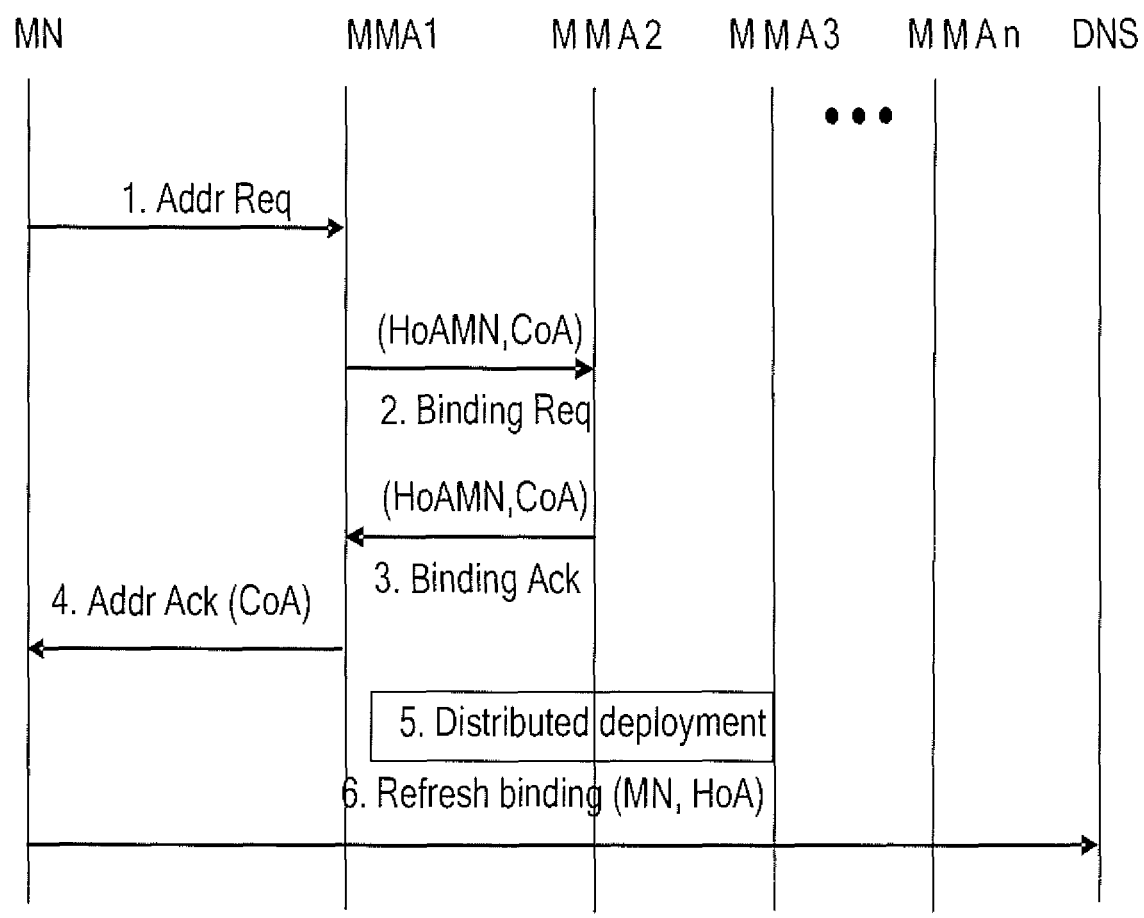
FIG. 3 is a flowchart of another MN registration method based on a distributed mobility management system in an embodiment of the present invention.

FIG. 3 is a flowchart of another MN registration method based on a distributed mobility management system in an embodiment of the present invention. The method includes the following steps:

(1) The MN enters AN1, and requests the IP address from the MMA. In this procedure, it is assumed that the MN sends a registration request to MMA1.

(2) After receiving the request, MMA1 allocates an IP address to the MN as a current locator (that is CoA) of the MN, and generates a random number according to the IP address (the algorithm for generating the random number is not limited, for example, Hash algorithm). The random number serves as an ID of the MN (namely, $HoA_{MN}$). Because the ID is generated randomly, a distributed deployment mechanism may be applied. After a specific MMA is selected, the IDs are evenly distributed and stored in the MMA. The binding relationship between the ID and the IP address of the MN is stored in the MMA. Because each MMA manages the IDs in a certain range, MMA1 selects MMA2 for storing the binding relationship between the ID and the IP address of the MN according to the ID generated for the MN. In the preceding process, MMA1 generates the ID randomly according to the IP address of the MN, and the ID is stored in MMA2.

(3) MMA2 queries the current binding relationship table first. If the list stores no information about the MN (namely, stores no $HoA_{MN}$), MMA2 inserts the binding relationship option of the MN into the list. If the list already stores the information about the MN, MM2 refreshes the IP address option in the MN entry of the binding relationship, and sends a binding success response to MMA1. If the binding between the ID and the IP address of the MN fails, MMA2 returns a binding failure response that carries a cause value to MMA1; MMA1 allocates a new IP address to the MN and generate a new $HoA_{MN}$, and binds the IP address to a reselected $HoA_{MN}$.

(4) MMA1 sends a response to the MN, where the response carries the IP address (that is CoA) allocated to the MN and the $HoA_{MN}$.

(5) Meanwhile, MMA2 stores a backup of the binding relationship table into the adjacent MMA.

(6) After obtaining the $HoA_{MN}$, the MN refreshes the binding relationship (MN, $HoA_{MN}$) on the Domain Name Server (DNS).

Figure 4:
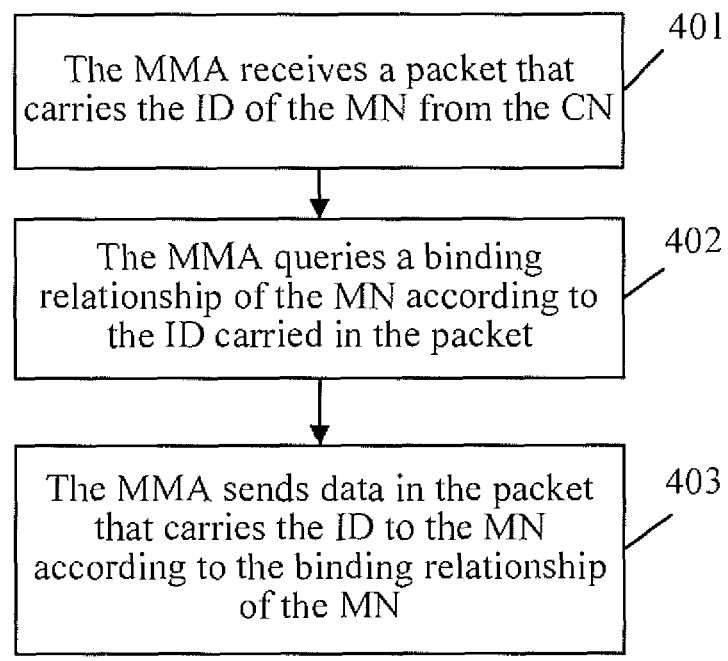
FIG. 4 is a flowchart of an MN communication method based on a distributed mobility management system in an embodiment of the present invention.

FIG. 4 is a flowchart of an MN communication method based on a distributed mobility management system in an embodiment of the present invention. The method includes the following steps:

401. The MMA receives a packet that carries an ID of an MN from a CN.

402. The MMA queries the binding relationship of the MN according to the ID carried in the packet.

403. The MMA sends data in the packet that carries the ID to the MN according to the binding relationship of the MN.

Figure 5:
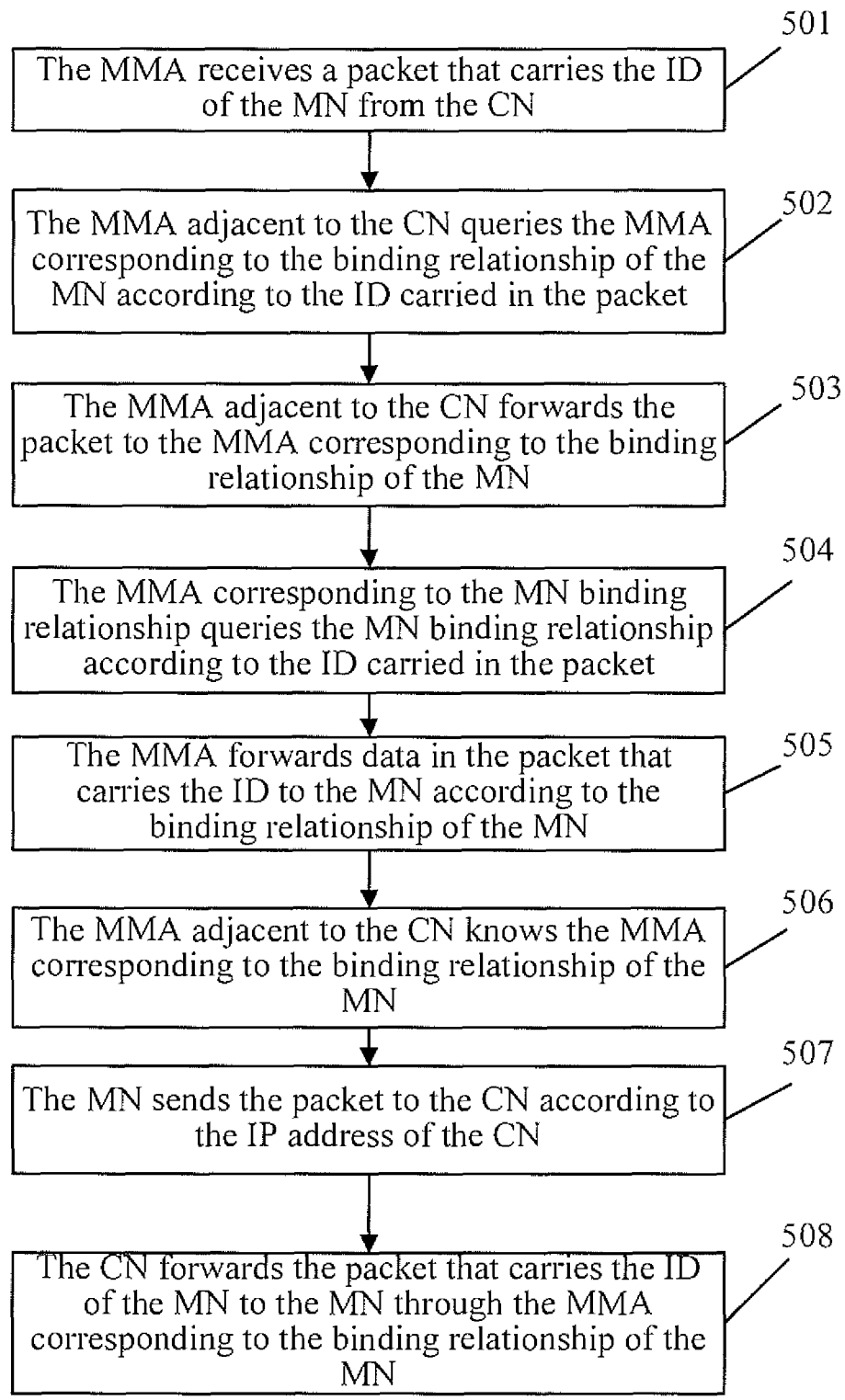
FIG. 5 is a flowchart of another MN communication method based on a distributed mobility management system in an embodiment of the present invention.

FIG. 5 is a flowchart of another MN communication method based on a distributed mobility management system in an embodiment of the present invention. The method includes the following steps:

501. The MMA receives a packet that carries an ID of an MN from a CN.

502. According to the ID carried in the packet, the MMA adjacent to the CN searches for the MMA corresponding to the MN binding relationship while the packet that carries the ID is forwarded. For example, it is assumed that MMAn is adjacent to the CN, and MMA2 corresponds to the MN binding relationship. If MMAn finds that the MN binding relationship is stored in MMA2 along MMAn→MMA3→MMA2, the packet sent by the CN to the MN is forwarded to MMA2 along MMAn→MMA3→MMA2 while the CN searches for the MMA.

503. The MMA adjacent to the CN forwards the packet to the MMA corresponding to the MN binding relationship.

504. The MMA corresponding to the MN binding relationship queries the MN binding relationship according to the ID carried in the packet.

505. The MMA forwards the data in the packet that carries the ID to the MN according to the MN binding relationship. More specifically, the MMA may forward the data in the packet to the MN according to the MN binding relationship in this way: replace the ID carried in the packet with the IP address of the MN and forward the packet to the MN; or add the IP address of the MN into the packet that carries the ID and forward the packet to the MN.

506. The MMA adjacent to the CN obtains the MMA corresponding to the MN binding relationship.

507. The MN sends a packet to the CN according to the IP address of the CN.

508. The CN forwards the packet that carries the ID of the MN to the MN through the MMA corresponding to the MN binding relationship.

Figure 6:
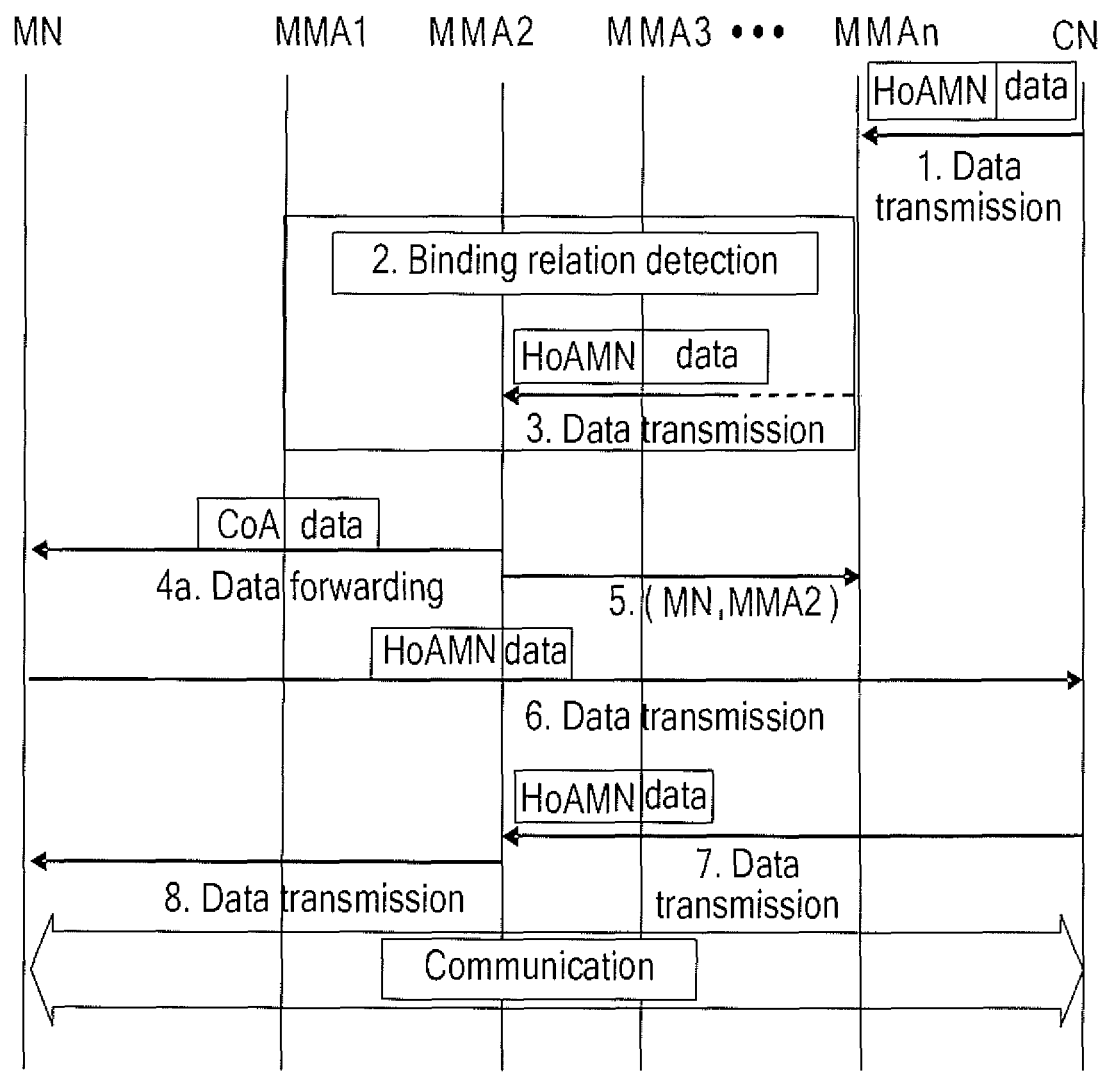
FIG. 6 is a flowchart of another MN communication method based on a distributed mobility management system in an embodiment of the present invention.

FIG. 6 is a flowchart of another MN communication method based on a distributed mobility management system in an embodiment of the present invention. In this embodiment, it is assumed that MMAn is adjacent to the CN; and the CN obtains the HoA of the MN by querying the DNS, or the MN notifies the HoA to the CN directly. The CN communicates with the MN through the $HoA_{MN}$. The detailed steps are as follows:

(1) When the CN uses $HoA_{MN}$ to initiate communication with the MN, the CN sends a packet to MMAn. MMAn is adjacent to the CN. When the CN exchanges data with the MN, if the CN uses $HoA_{MN}$ to communicate with the MN, the MN needs to send data to the CN by using the same $HoA_{CN}$. That is, the communication identifier used by the MN for sending data needs to be the same as the communication identifier used by the CN for initiating the communication.

(2) MNAn obtains the MMA corresponding to the MN binding relationship through a query mechanism. In this procedure, it is assumed that the MN binding relationship exists on MMA2. The query mechanism mentioned here enables search based on an algorithm such as Chord and Pastry.

In the query process, MMAn may pass through multiple hops according to the algorithm. In this process, MMAn forwards the packet to the next-hop MMA directly. For example, if MMAn finds that the MN binding relationship exists in MMAn→MMA3→MMA2, the packet sent by the CN to the MN is forwarded to MMA2 along MMAn→MMA3→MMA2.

(3) MMAn forwards the packet to MMA2 that stores the MN binding relationship.

(4) MMA2 forwards the packet to the MN. When the packet arrives at MMA2 and will be sent to the MN, MMA2 needs to replace the MN ID carried in the packet with the IP address of the MN according to the stored MN binding relationship, and then send the packet that carries the IP address of the MN to the MN.

(5) Meanwhile, MMA2 tells MMAn that the MN binding relationship exists here.

(6) The MN sends the packet to the CN.

(7, 8) The CN sends the packet to the MN again. The packet may be sent to MMA2 directly, and forwarded to the MN through MMA2.

Figure 7:
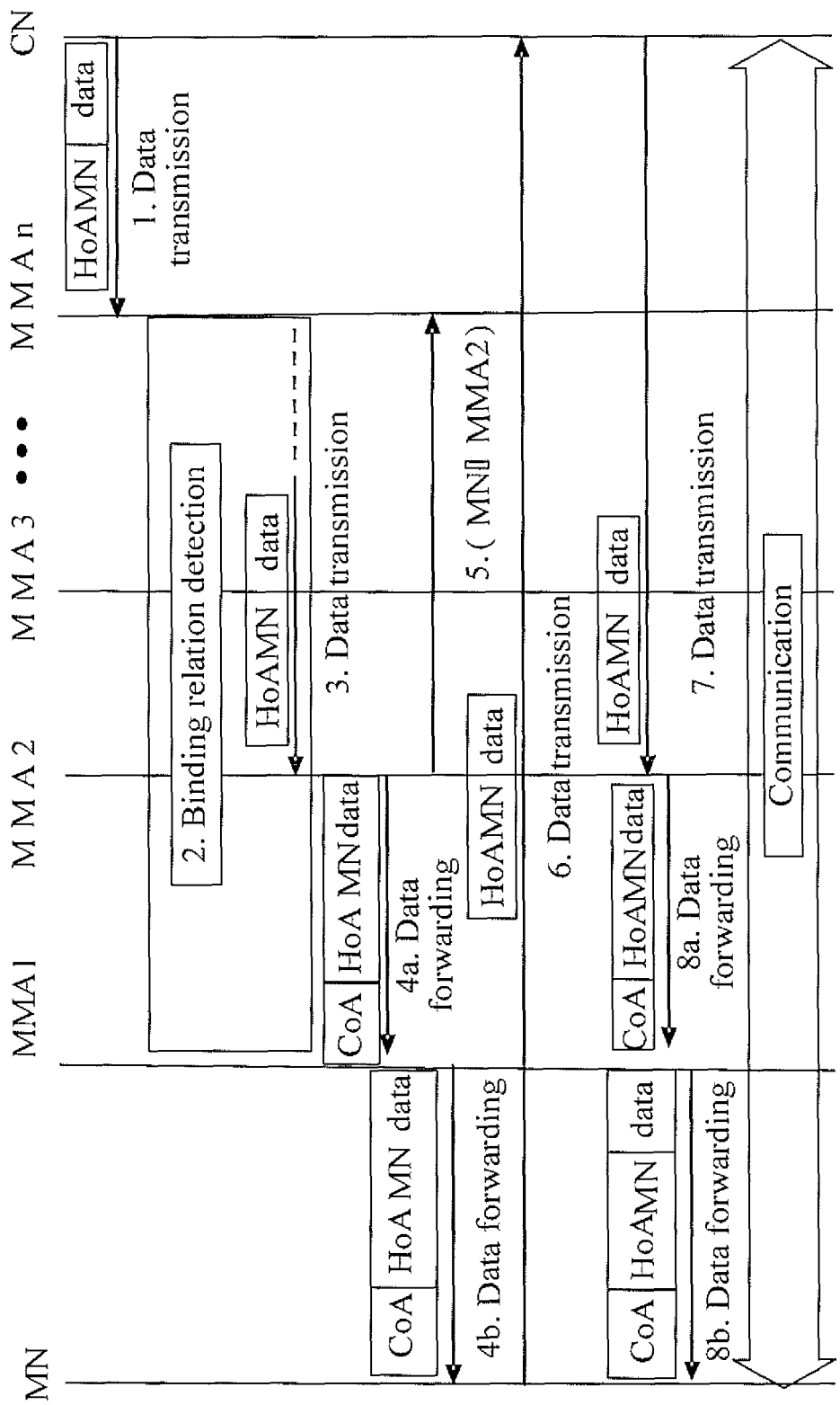
FIG. 7 is a flowchart of another MN communication method based on a distributed mobility management system in an embodiment of the present invention.

FIG. 7 is a flowchart of another MN communication method based on a distributed mobility management system in an embodiment of the present invention. In this embodiment, after the MN hands over to a new network, namely, the IP address allocated by the new network to the MN is nCoA, the continuity of the communication between the CN and the MN is maintained through a tunnel between the old MMA (oMMA) and the new MMA (nMMA). The detailed steps are as follows:

(1) When the CN uses $HoA_{MN}$ to initiate communication with the MN, the CN sends a packet to MMAn (MMAn is adjacent to the CN).

(2) MMAn obtains the MMA corresponding to the MN binding relationship through a query mechanism. In this procedure, it is assumed that the MN binding relationship exists on MMA2. The query mechanism mentioned here enables search based on an algorithm such as Chord and Pastry. The MMAn forwards the packet to the next-hop MMA directly through the preceding algorithm. For example, according to the algorithm, the forwarding path may be: MMAn→MMA3→MMA2.

(3) MMAn forwards the packet to MMA2 that stores the MN binding relationship.

(4) MMA2 forwards the packet to the MN. In this procedure, MMA2 does not replace the destination address of the packet, but the tunnel mechanism applies. A new source address (IP address of MMA2) and a new destination address (CoA of the MN) are added onto the outer layer of the packet.

(5) Meanwhile, MMA2 tells MMAn that the MN binding relationship exists here.

(6) The MN sends the packet to the CN.

(7, 8) The CN sends the packet to the MN again. The packet may be sent to MMA2 directly, and forwarded to the MN through MMA2.

Figure 8:
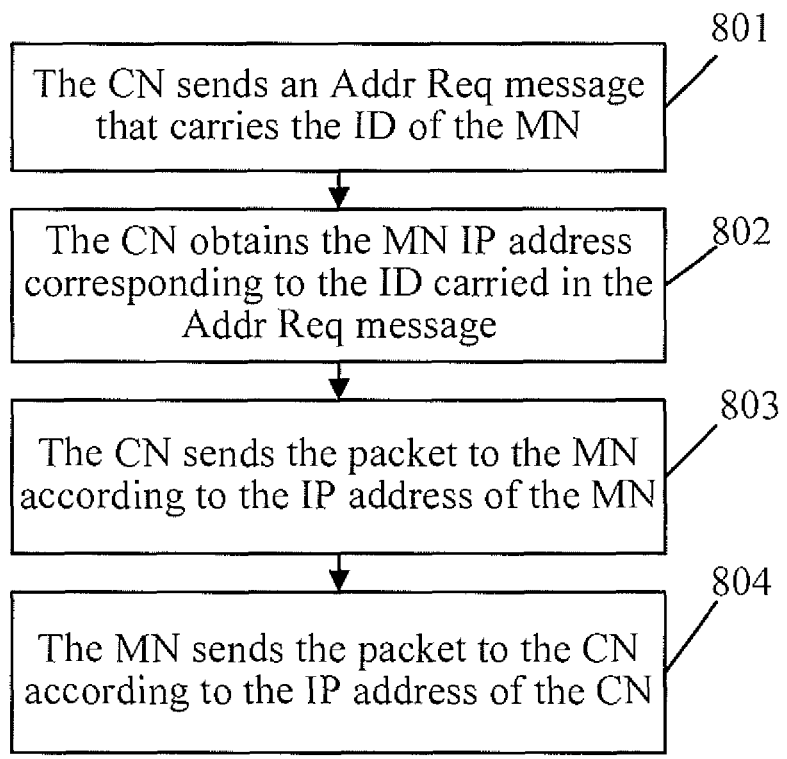
FIG. 8 is a flowchart of another MN communication method based on a distributed mobility management system in an embodiment of the present invention.

FIG. 8 is a flowchart of another MN communication method based on a distributed mobility management system in an embodiment of the present invention. The method includes the following steps:

801. The CN sends an address request (Addr Req) message that carries the ID of the MN.

802. The CN obtains the MN IP address corresponding to the ID carried in the Addr Req message.

803. The CN sends a packet to the MN according to the IP address of the MN.

804. The MN sends a packet to the CN according to the IP address of the CN.

Figure 9:
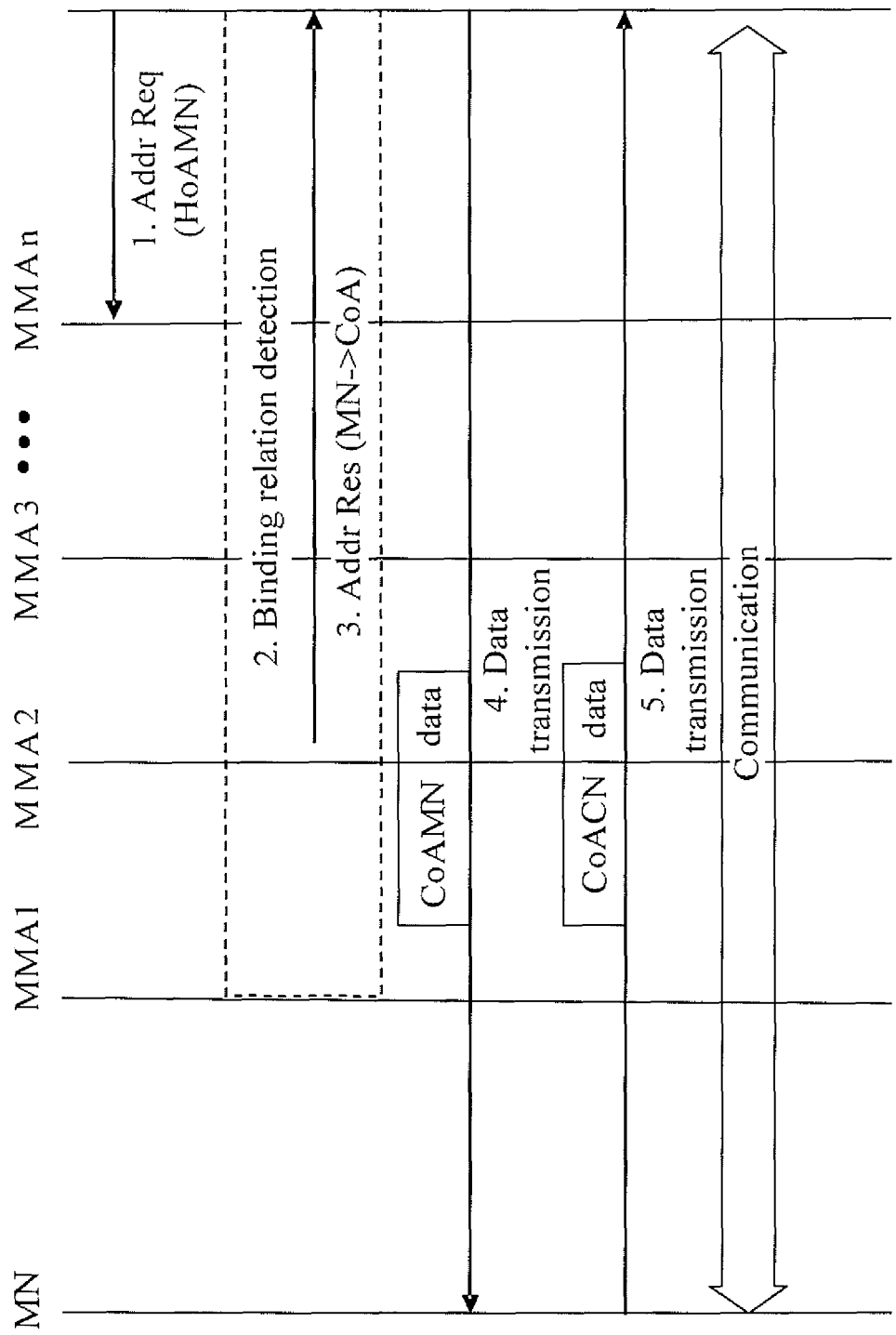
FIG. 9 is a flowchart of another MN communication method based on a distributed mobility management system in an embodiment of the present invention.

FIG. 9 is a flowchart of another MN communication method based on a distributed mobility management system in an embodiment of the present invention. In the process of implementing this embodiment, if the software of the CN is upgraded, the CN can obtain the CoA of the MN. After obtaining the CoA of the MN, the CN communicates with the MN directly in the following procedure:

(1) The CN sends an Addr Req message that carries the HoA of the MN, requesting the current IP address (CoA) of the MN.

(2, 3) MMAn obtains the current IP address (CoA) of the MN through a query mechanism, and sends the CoA to the CN.

(4) The CN sends a packet to the MN directly through an ordinary routing mechanism.

(5) The MN sends a packet to the CN.

In the preceding communication process, the CN needs to pass through MMA2 (namely, the MMA that stores the binding relationship between the IP address and the ID of the MN) and the default MMA of the MN, and then forward the data to the MN. In the preceding data forwarding process, the CN sends the packet that carries the ID to MM2. MMA2 replaces the ID in the packet with the IP address according to the stored binding relationship between the IP address and the ID of the MN, and then forwards the packet that carries the IP address to the default MMA of the MN. Afterward, the default MMA of the MN forwards the data to the MN. While the default MMA of the MN forwards the data to the MN, the IP address carried in the packet needs to be replaced with the ID bound to the IP address and stored in MMA2. The IP address may be replaced with the ID by the default MMA of the MN, or by the MN. If the replacement is performed by the default MMA of the MN, the default MMA of the MN needs to obtain the list of binding relationship between the IP address and the ID of the MN from MMA2. After the MN moves out of the current default MMA, the current default MMA deletes the list of binding relationship between the IP address and the ID of the MN according to the absent state of the MN. If the replacement is performed by the MN, the MN needs to be upgraded.

Figure 10:
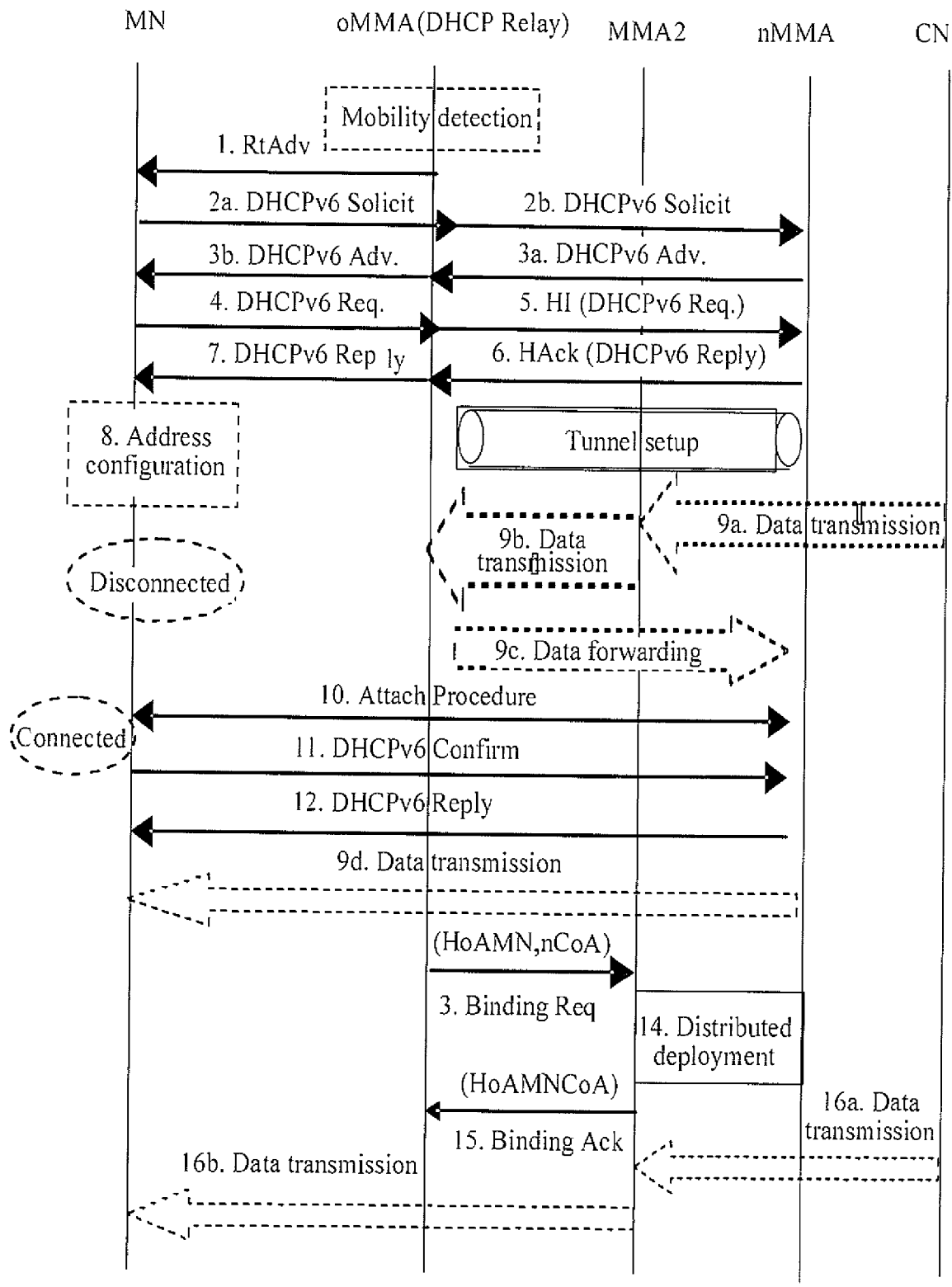
FIG. 10 is a flowchart of a handover method based on a distributed mobility management system in an embodiment of the present invention.

FIG. 10 is a flowchart of a handover method based on a distributed mobility management system in an embodiment of the present invention. In this embodiment, when the MN is communicating with the CN, the handover procedure of the MN is as follows:

(1) The MN moves toward AN2. The oMMA determines that the MN is about to hand over according to the obtained MN location information, and sends an RtAdv message to the MN actively. The message carries the information related to address configuration. The mode of exchanging the location information differs with the type of the network, and is not limited herein. The type of the network may be: $3^{rd}$-Generation (3G) network, System Architecture Evolvement (SAE) network, or Worldwide Interoperability for Microwave Access (WiMAX) network.

(2) According to the information in the RtAdv message, the MN initiates a DHCPv6 procedure, and sends a DHCPv6 Solicit message to the nMMA. As a DHCPv6 relay, the oMMA forwards the message to the nMMA.

(3) Through the oMMA relay, the nMMA returns a DHCPv6 Adv Message to the MN, indicating that the nMMA can serve as a DHCPv6 server of the MN.

(4) The MN sends a DHCPv6 Req message to the nMMA, requesting an IP address.

(5) After receiving the DHCPv6 Req message from the MN, the oMMA adds the message into a Handover Initiate (HI) message, and sends the HI message together with the oCoA of the MN to the nMMA, thus initiating handover.

(6) After receiving the HI message that carries the DHCPv6 Req message, the nMMA selects an nCoA in the IP address pool, allocates the nCoA to the MN for use in the new network, and binds the allocated nCoA to the oCoA of the MN temporarily to set up a bidirectional tunnel. In addition, in response to the HI message, the nMMA sends a Handover Acknowledge (HAck) message that carries a DHCPv6 Reply message to the oMMA.

(7) After receiving the HAck message, the oMMA retrieves the relevant information to finish setting up the bidirectional tunnel. Still as a DHCPv6 relay, the oMMA forwards the DHCPv6 Reply message to the MN. Now, the bidirectional tunnel between the oMMA and the nMMA is setup, which is designed to forward data and keep communication continuity of the MN.

(8) The MN configures the nCoA according to the information carried in the received the DHCPv6 Reply message.

(9a, b, c) The MN continues moving toward the nMMA, and is disconnected from the oMMA. After detecting that the MN is disconnected, the oMMA forwards data to the nMMA through a bidirectional tunnel based on a storage and forwarding mechanism.

(10) After arriving at the new network covered by the nMMA, the MN initiates an attaching procedure to connect with the new network.

(11) The MN sends a DHCPv6 Confirm message to the nMMA by using the configured nCoA, requesting the nMMA to confirm use of the nCoA. Meanwhile, when necessary, the MN reserves the oCoA for keeping continuity of communication with the CN, where the communication begins before the handover.

(12) The nMMA returns a DHCPv6 Reply message to the MN, indicating that the MN can use the nCoA in the new network.

(9d) The nMMA forwards the packet from the oMMA to the MN. For the packet sent from the oMMA and forwarded through a bidirectional tunnel to the MN, the destination address is the oCoA of the MN in order to ensure continuity of existing communication.

(13) The oMMA sends a request for refreshing the binding relationship to MMA2 on which the MN binding relationship is registered, and the binding relationship is refreshed to (HoA$_{MN}$, oCoA)→(HoA$_{MN}$, nCoA).

(14) MMA2 spreads the new binding relationship (HoA$_{MN}$, oCoA)→(HoA$_{MN}$, nCoA) of the MN to the adjacent MMA.

(15) MMA2 returns a binding success response to the oMMA.

(16a, b) When the MN sets up new communication in the new network, MMA2 sends the packet from the CN to the MN according to the IP address corresponding to the binding option of the MN in the binding relationship table. After the MN binding relationship on MMA2 is refreshed, if the CN that keeps communication with the MN sends a packet to the MN, MMA2 replaces the ID carried in the packet with the IP address bound to the ID, and sends the packet that carries the IP address to the MN.

Figure 11A:
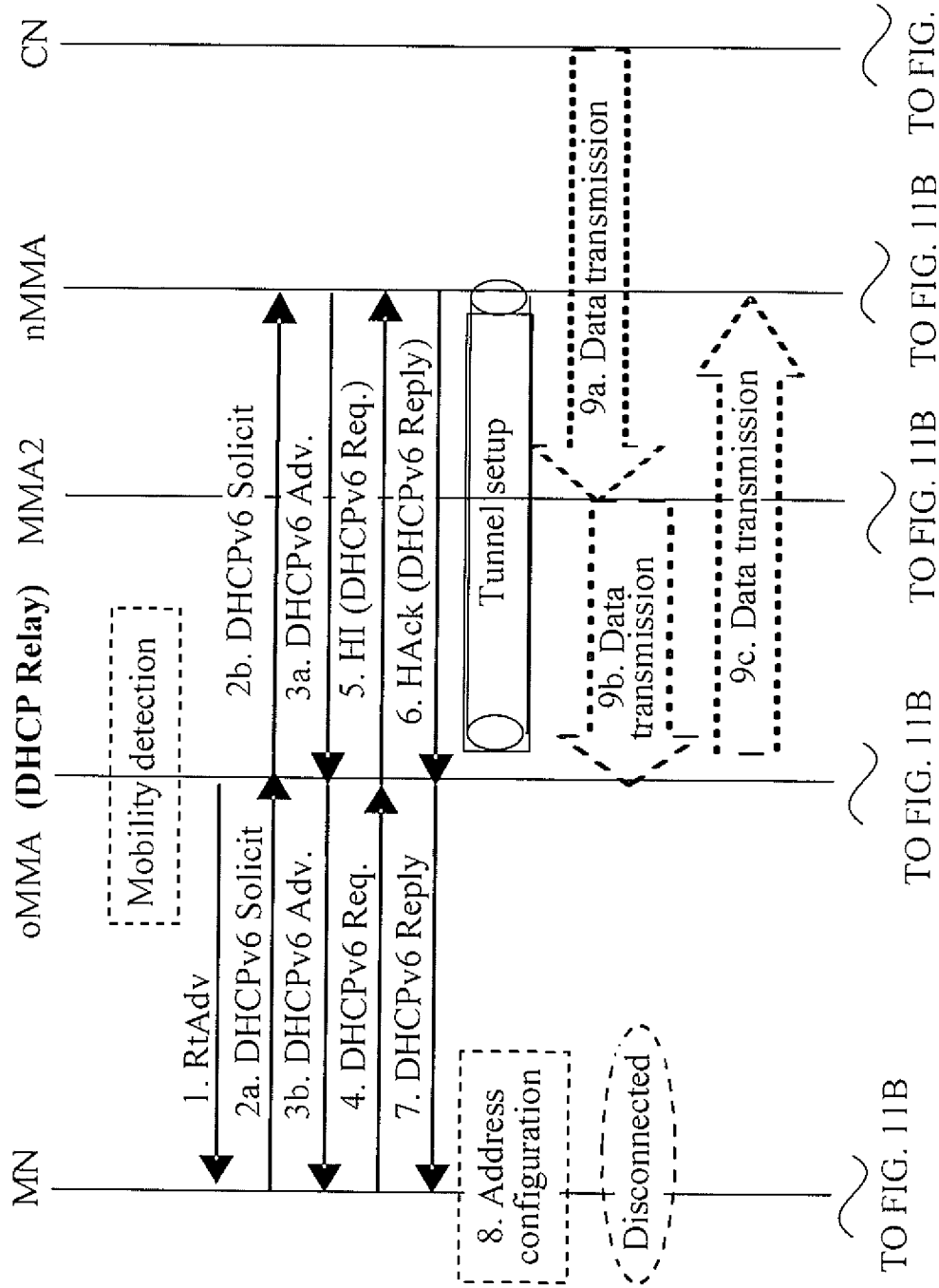
FIGS. 11A and 11B are a flowchart of another handover method based on a distributed mobility management system in an embodiment of the present invention.
Figure 11B:
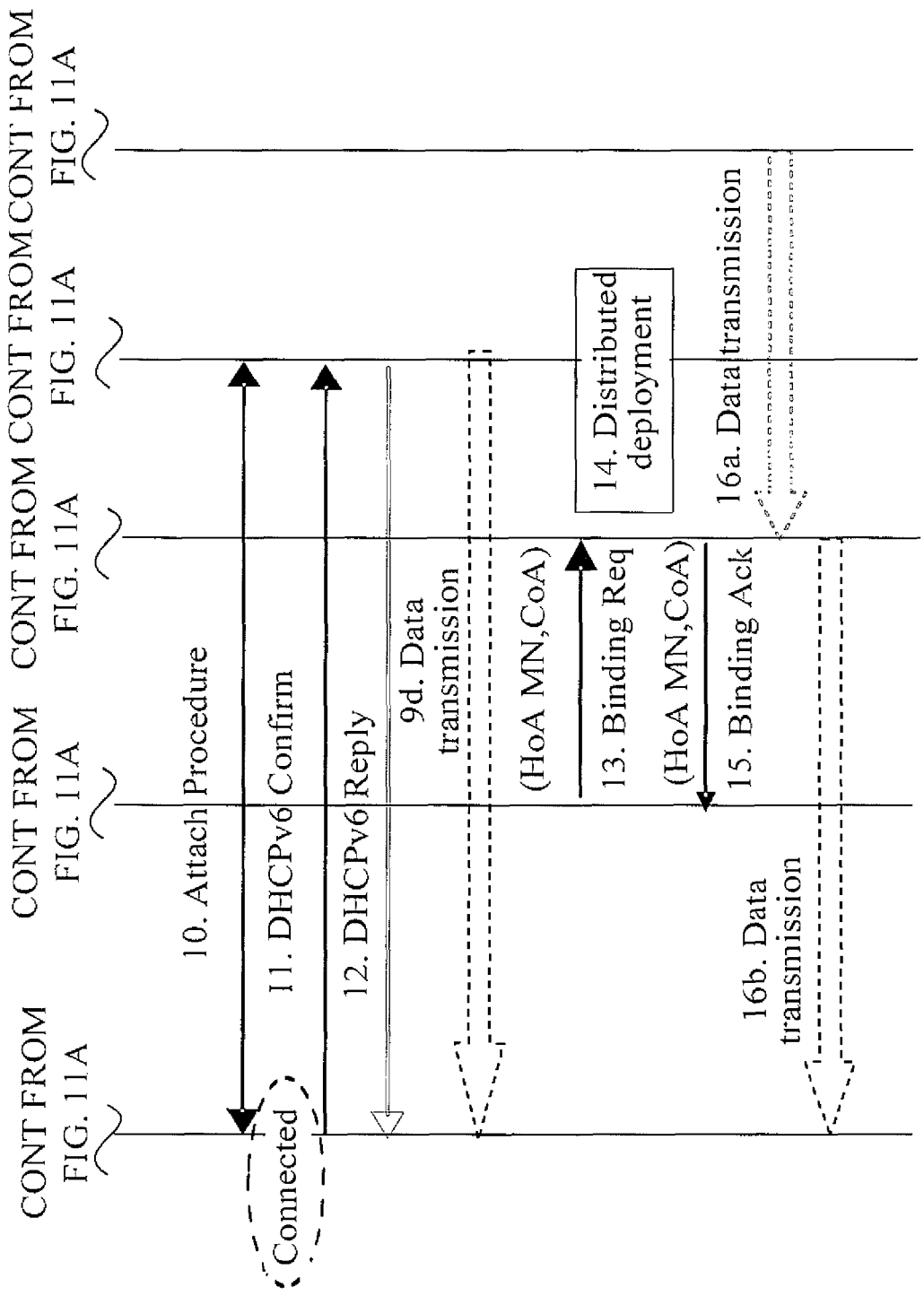

FIG. 11 is a flowchart of another handover method based on a distributed mobility management system in an embodiment of the present invention. In this embodiment, after the MN uses a new CoA (namely, nCoA), the underway communication between the CN and the MN is maintained through a tunnel between the oMMA and the nMMA, as detailed below:

(1) The MN moves toward AN2. The oMMA determines that the MN is about to hand over according to the obtained MN location information, and sends an RtAdv message to the MN actively. The message carries the information related to address configuration. The mode of exchanging the location information differs with the type of the network, and is not limited herein. The type of the network may be: 3G network, SAE network, or WiMAX network.

(2) According to the information in the RtAdv message, the MN initiates a DHCPv6 procedure, and sends a DHCPv6 Solicit message to the nMMA. As a DHCPv6 relay, the oMMA forwards the message to the nMMA.

(3) Through the oMMA relay, the nMMA returns a DHCPv6 Adv Message to the MN, indicating that the nMMA can serve as a DHCPv6 server of the MN.

(4) The MN sends a DHCPv6 Req message to the nMMA, requesting an IP address.

(5) After receiving the DHCPv6 Req message from the MN, the oMMA adds the message into an HI message, and sends the HI message together with the oCoA of the MN to the nMMA, thus initiating handover.

(6) After receiving the HI message that carries the DHCPv6 Req message, the nMMA selects an nCoA in the IP address pool, allocates the nCoA to the MN for use in the new network, and binds the allocated nCoA to the oCoA of the MN temporarily to set up a bidirectional tunnel. In addition, in response to the HI message, the nMMA sends an HAck message that carries a DHCPv6 Reply message to the oMMA.

(7) After receiving the HAck message, the oMMA retrieves the relevant information to finish setting up the bidirectional tunnel. Still as a DHCPv6 relay, the oMMA forwards the DHCPv6 Reply message to the MN. Now, the bidirectional tunnel between the oMMA and the nMMA is setup, which is designed to forward data and keep communication continuity of the MN.

(8) The MN configures the nCoA according to the information carried in the received the DHCPv6 Reply message.

(9a, b, c) The MN continues moving toward the nMMA, and is disconnected from the oMMA. After detecting that the MN is disconnected, the oMMA forwards data to the nMMA through a bidirectional tunnel based on a storage and forwarding mechanism.

(10) After arriving at the new network covered by the nMMA, the MN initiates an attaching procedure to connect with the new network.

(11) The MN sends a DHCPv6 Confirm message to the nMMA by using the configured nCoA, requesting the nMMA to confirm use of the nCoA. Meanwhile, when necessary, the MN reserves the oCoA for keeping continuity of communication with the CN, where the communication begins before the handover.

(12) The nMMA returns a DHCPv6 Reply message to the MN, indicating that the MN can use the nCoA in the new network.

(9d) The nMMA forwards the packet from the oMMA to the MN. For the packet sent from the oMMA and forwarded through a bidirectional tunnel to the MN, the destination address is the oCoA of the MN in order to ensure continuity of existing communication.

(13) The oMMA sends a request for refreshing the binding relationship to MMA2 on which the MN binding relationship is registered, and the binding relationship is refreshed to (HoA$_{MN}$, oCoA)→(HoA$_{MN}$, nCoA).

(14) MMA2 spreads the new binding relationship (HoA$_{MN}$, oCoA)→(HoA$_{MN}$, nCoA) of the MN to the adjacent MMA.

(15) MMA2 returns a binding success response to the oMMA.

(16a, b) After the MN binding relationship on MMA2 is refreshed, if the CN that keeps communication with the MN sends a packet to the MN, MMA2 applies a tunnel mechanism, and adds a tunnel header onto the outer layer of the packet. The tunnel header is a new source address (IP address of MMA2) and a new destination address (nCoA of the MN). According to the address information in the tunnel header on the outer layer of the packet, the data is sent to the MN directly. Afterward, the MN removes the tunnel header.

Figure 12:
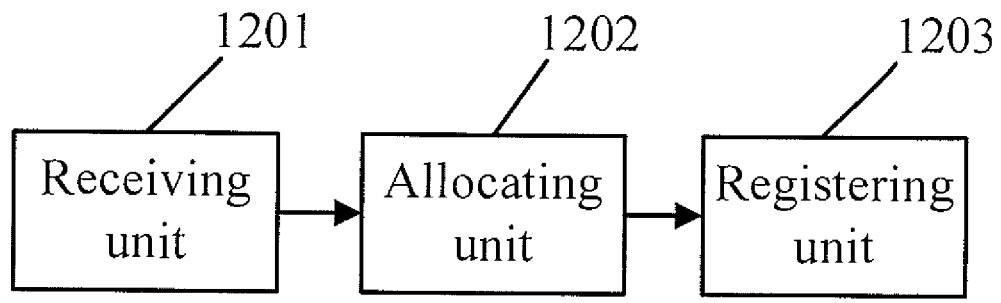
FIG. 12 shows a structure of an MN registration apparatus provided in an embodiment of the present invention.

As shown in FIG. 12, an MN registration apparatus is provided in an embodiment of the present invention. The apparatus includes:

a receiving unit 1201, adapted for an MMA to receive an IP address obtaining request sent by an MN;

an allocating unit 1202, adapted to allocate an IP address to the MN and obtain identifier information of the MN according to the IP address obtaining request sent by the MN; and a registering unit 1203, adapted to bind the IP address of the MN to the identifier information according to the identifier information, where the identifier information is registered with a location management server through the MN.

Figure 13:
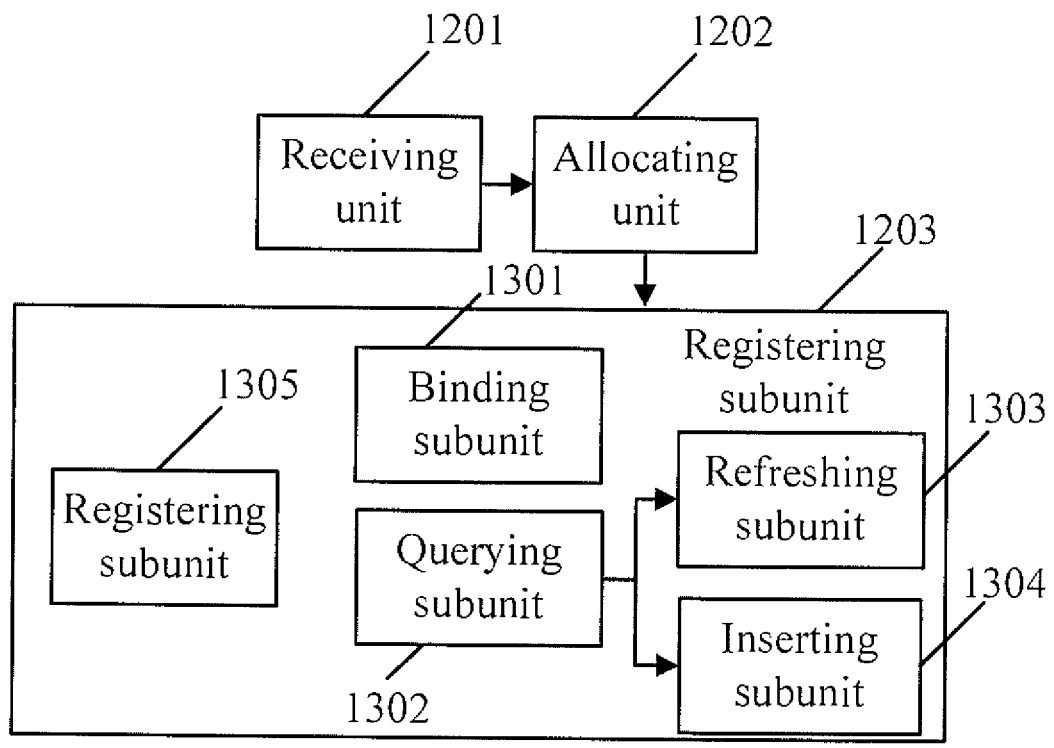
FIG. 13 shows a structure of another MN registration apparatus provided in an embodiment of the present invention.

As shown in FIG. 13, another MN registration apparatus is provided in an embodiment of the present invention. The apparatus includes:

a receiving unit 1201, adapted for an MMA to receive an IP address obtaining request sent by an MN;

an allocating unit 1202, adapted to allocate an IP address to the MN and obtain identifier information of the MN according to the IP address obtaining request sent by the MN; and a registering unit 1203, adapted to bind the IP address of the MN to the identifier information according to the identifier information, where the identifier information is registered with a location management server through the MN.

This unit further includes:

a binding subunit 1301, adapted to bind the identifier information to the IP address of the MN;

a querying subunit 1302, adapted to query a binding relationship table according to the identifier information of the MN;

a refreshing subunit 1303, adapted to refresh the binding relationship table according to the binding relationship between the IP address and the identifier information of the MN if the identifier information of the MN exists in the binding relationship table;

an inserting subunit 1304, adapted to insert the binding relationship between the IP address and the identifier information of the MN into the binding relationship table if the identifier information of the MN does not exist in the binding relationship table; and a registering subunit 1305, adapted to register the identifier information of the MN with a location management server.

Figure 14:
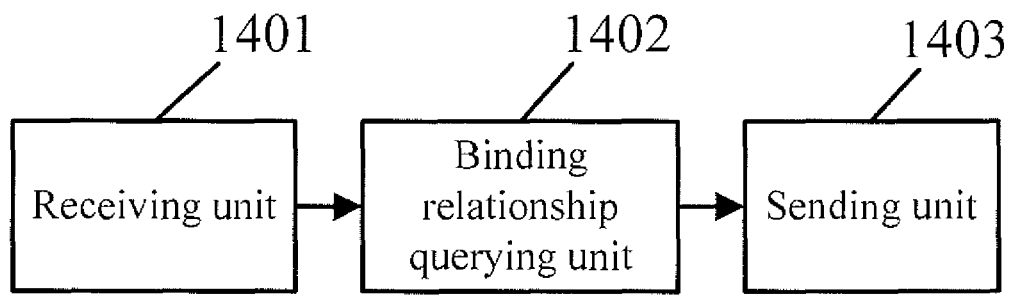
FIG. 14 shows a structure of an MN communication apparatus based on a distributed mobility management system in an embodiment of the present invention.

FIG. 14 shows an MN communication apparatus based on a distributed mobility management system in an embodiment of the present invention. The apparatus includes:

a receiving unit 1401, adapted for an MMA to receive a packet that carries an ID of an MN from a CN;

a binding relationship querying unit 1402, adapted to query a binding relationship of the MN according to the ID carried in the packet; and a sending unit 1403, adapted to send data in the packet that carries the ID to the MN according to the binding relationship of the MN.

Figure 15:
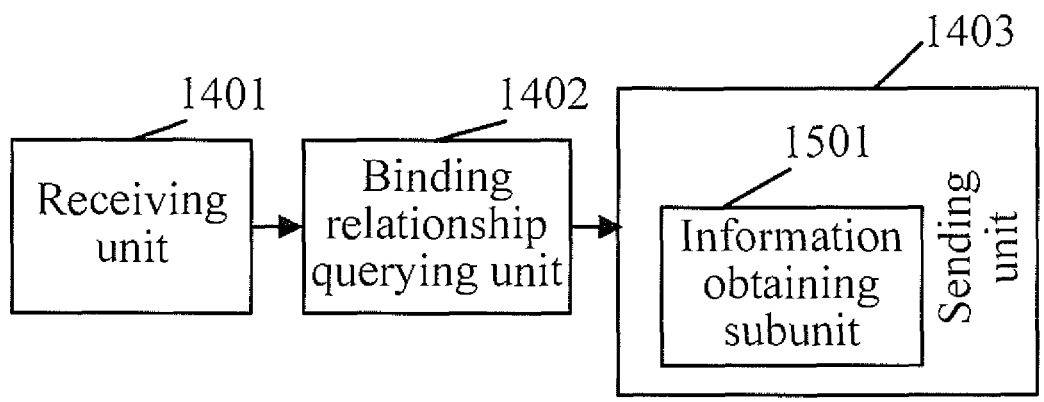
FIG. 15 shows a structure of another MN communication apparatus based on a distributed mobility management system in an embodiment of the present invention.

FIG. 15 shows another MN communication apparatus based on a distributed mobility management system in an embodiment of the present invention. The apparatus includes:

a receiving unit 1401, adapted for an MMA to receive a packet that carries an ID of an MN from a CN;

a binding relationship querying unit 1402, adapted to query a binding relationship of the MN according to the ID carried in the packet;

a sending unit 1403, adapted to send data in the packet that carries the ID to the MN according to the binding relationship of the MN; and an information obtaining subunit 1501, adapted to obtain the MMA corresponding to the MN binding relationship.

Figure 16:
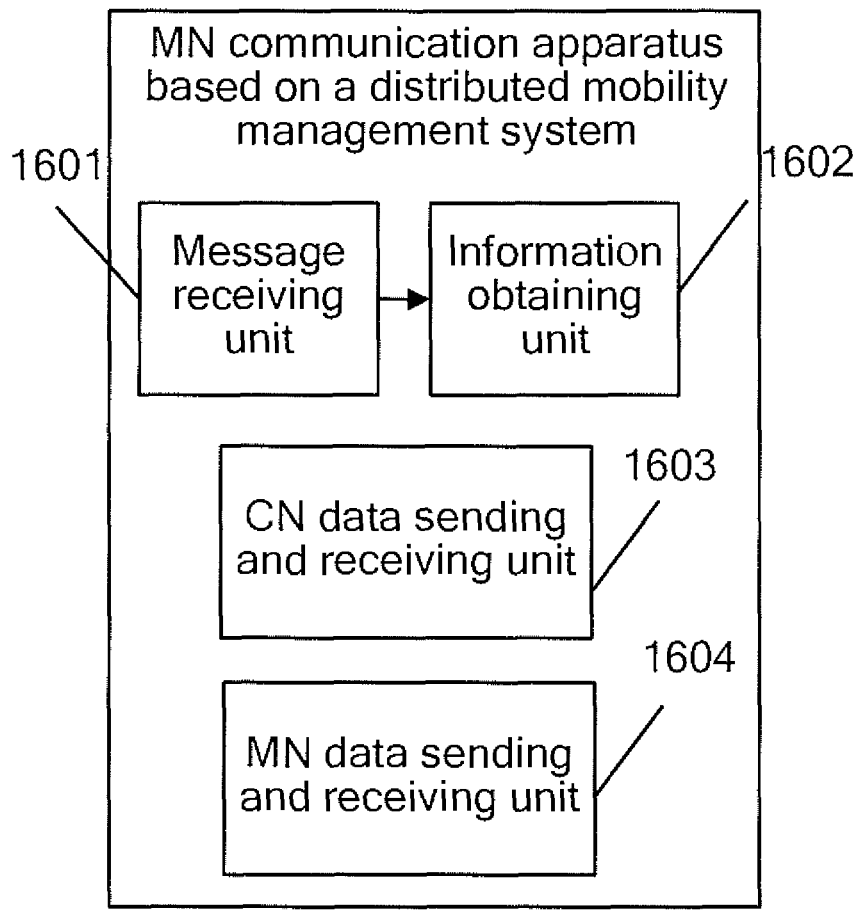
FIG. 16 shows a structure of another MN communication apparatus based on a distributed mobility management system in an embodiment of the present invention.

FIG. 16 shows another MN communication apparatus based on a distributed mobility management system in an embodiment of the present invention. The apparatus includes:

a message receiving unit 1601, adapted for an MMA to receive an Addr Req message that carries an ID of an MN;

an information obtaining unit 1602, adapted to obtain an IP address of the MN according to the ID carried in the Addr Req message;

a CN data sending and receiving unit 1603, adapted to send a packet to the MN and receive data from the MN according to the IP address of the MN; and an MN data sending and receiving unit 1604, adapted to send a packet to the CN and receive data from the CN according to the IP address of the CN.

Figure 17:
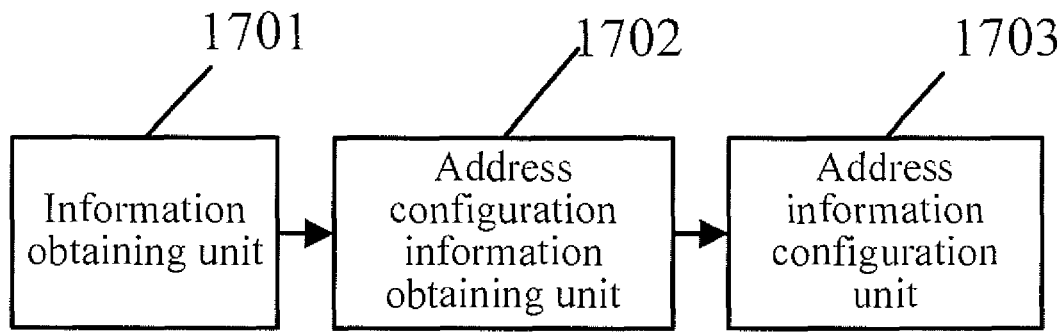
FIG. 17 shows a structure of a handover apparatus based on a distributed mobility management system in an embodiment of the present invention.

FIG. 17 shows a handover apparatus based on a distributed mobility management system in an embodiment of the present invention. The handover apparatus includes:

an information obtaining unit 1701, adapted to obtain location information of an MN in a source network and routing information of the MN in an AN when the MN moves from an area covered by the source network to the AN;

an address configuration information obtaining unit 1702, adapted to obtain destination address configuration information of the MN in the AN according to the location information in the source network and the routing information in the AN; and an address information configuring unit 1703, adapted to configure destination address information for the MN after the MN hands over from the source network to the AN.

Figure 18:
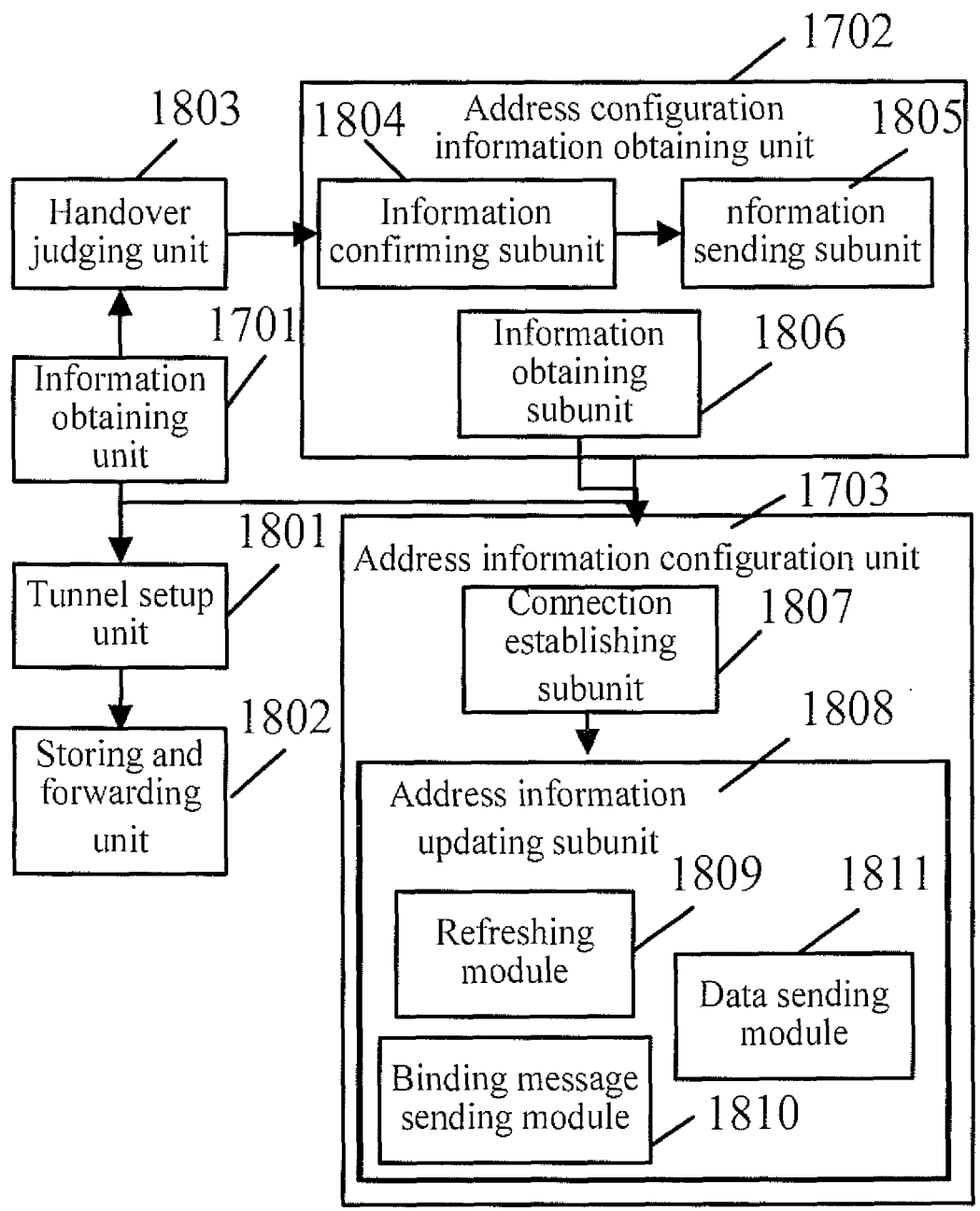
FIG. 18 shows a structure of another handover apparatus based on a distributed mobility management system in an embodiment of the present invention.

FIG. 18 shows another handover apparatus based on a distributed mobility management system in an embodiment of the present invention. The handover apparatus includes:

an information obtaining unit 1701, adapted to obtain location information of an MN in a source network and routing information of the MN in an AN when the MN moves from an area covered by the source network to the AN;

a tunnel setup unit 1801, adapted to set up a bidirectional tunnel according to address configuration information of the MN in the source network and the destination address configuration information;

a storing and forwarding unit 1802, adapted to store and forward the communication data between the MN and the CN through the bidirectional tunnel after detecting that the MN is disconnected from the source network;

a handover judging unit 1803, adapted to judge whether the MN is about to hand over according to location information of the MN in the source network and routing information of the MN in the AN; and an address configuration information obtaining unit 1702, adapted to obtain destination address configuration information of the MN in the AN according to the location information in the source network and the routing information in the AN.

The address configuration information obtaining unit 1702 further includes:

an information confirming subunit 1804, adapted to confirm that the MMA in the AN will serve as a server of the MN and confirm the destination address configuration information with the AN according to the obtained destination address configuration information;

an information sending subunit 1805, adapted to send an HI message to the MMA of the AN, where the HI message carries the address configuration information of the source network and the AN destination address configuration information requested by the MN;

an information obtaining subunit 1806, adapted to receive a HAck message, and obtain the destination address configuration information of the MN in the AN; and an address information configuring unit 1703, adapted to configure destination address information for the MN after the MN hands over from the source network to the AN.

The address information configuring unit 1703 includes:

a connection establishing subunit 1807, adapted to establish a connection between the MN and the AN when the MN moves from the source network to an area covered by the AN;

an address information updating subunit 1808, adapted for the MN to update the source address configuration information to the destination address configuration information, and reserve the address configuration information of the MN in the source network. The address information updating subunit 1805 further includes:

a refreshing module 1809, adapted to refresh the MMA that stores the MN binding relationship;

a binding message sending module 1810, adapted for the MMA that stores the MN binding relationship to send a binding success message to the MMA in the source network of the MN; and a data sending module 1811, adapted to send data to the MN through the MMA that stores the MN binding relationship.

Figure 19:
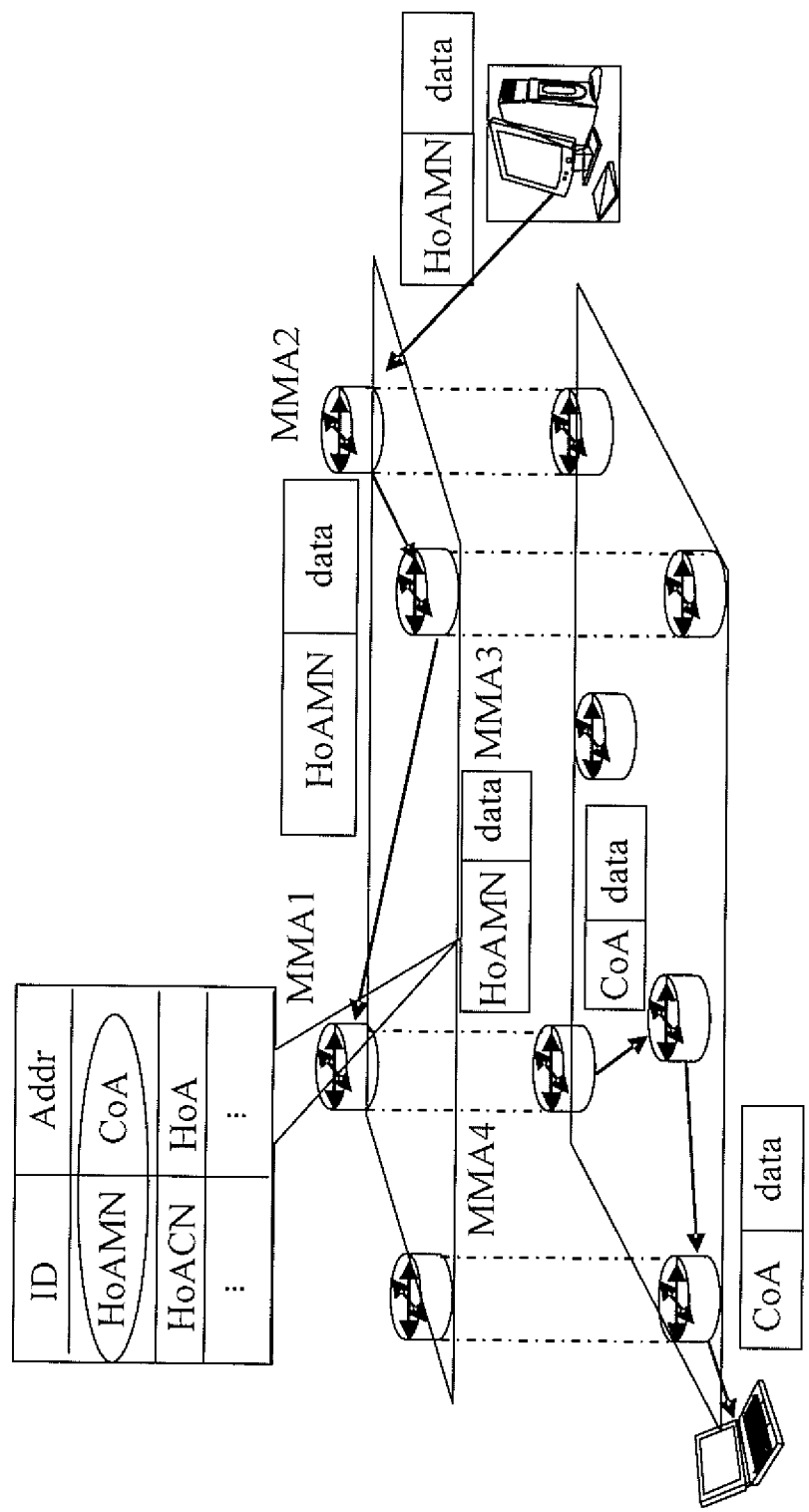
FIG. 19 shows a structure of a distributed mobility management system provided in an embodiment of the present invention.

FIG. 19 shows a distributed mobility management system in an embodiment of the present invention. The system includes at least two MMAs; any two MMAs are interconnected; at least one terminal exists in each MMA connection; each MMA stores a terminal binding relationship table; and the terminal binding relationship table records IDs and IP addresses of terminals. The MMA is adapted to:

(a) store a list of binding relationships between the ID and the IP address of a mobile terminal;

(b) provide a dynamic modification mechanism so that the mobile terminal can update the IP address in time through interaction with the MMA after the IP address is modified;

(c) provide a distributed deployment mechanism, through which the binding relationship between the ID and the IP address can be stored and backed up on another MMA in the network properly in order for the CN to obtain the current address of the MN; and (d) provide a query mechanism so that the CN can obtain the current address of the MN through query.

The terminal may be an MN or a CN.

The MN may be a mobile terminal, and is identified by a permanent IP allocated when the MN accesses the network for the first time. The MN may be a notebook computer, single-mode or multi-mode mobile phone, Personal Digital Assistant (PDA), or Integrated Access Device (IAD).

The CN is a node that can communicate with the MN. It is a fixed node or a mobile node. If the CN is a mobile node, it is equivalent to an MN.

Figure 20:
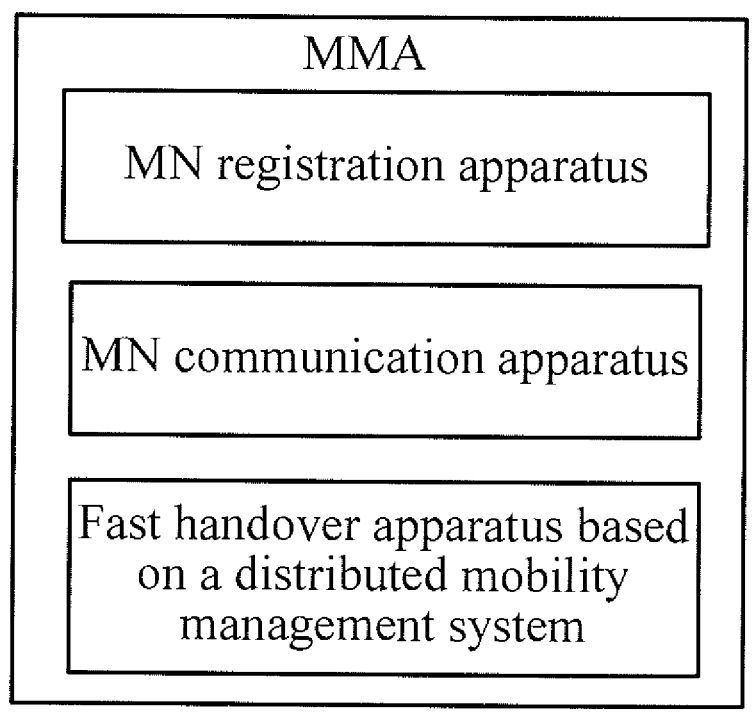
FIG. 20 shows a structure of an MMA in a distributed mobility management system in an embodiment of the present invention.

FIG. 20 shows a structure of an MMA in a distributed mobility management system in an embodiment of the present invention. The MMA includes: an MN registration apparatus, an MN communication apparatus, and a handover apparatus based on a distributed mobility management system.

The MN registration apparatus is adapted to perform binding registration for a mobile terminal and store a binding relationship table of the mobile terminal in the MMA.

The MN communication apparatus is adapted to forward data according to binding relationships stored in the MMA when the terminal needs to communicate.

The handover apparatus based on a distributed mobility management system is adapted to: configure destination address information for the mobile terminal according to the location information of the mobile terminal in a source network and routing information of the mobile terminal in an AN when the mobile terminal hands over from the source network to the AN; and update the binding relationship table.

In the embodiments of the present invention, the MMA stores a binding relationship table, the list stores the binding relationships between the MN identifier and the IP address allocated by the current network to the MN. In this way, the MN can communicate with the CN in the current network directly by using the IP address allocated by the current network. The data exchanged between the MN and the CN does not necessarily pass through the HA of the home network, but passes through the MMA of the current network directly. In the prior art, however, the data traffic is large in the home network and the processing capability is low, the HA design is complicated, and the load is heavy. By comparison, the distributed mobility management system in the embodiments of the present invention can balance load, improve the data processing capability, simplify the signaling interaction in various procedures, and improve the system processing capability.

What is claimed is:

1. A Mobile Node (MN) communication method, comprising:

receiving, by a first Mobility Management Anchor (MMA), a packet that carries an identifier (ID) of an MN from a Corresponding Node (CN);

querying a binding relationship of the MN according to the ID carried in the packet; and sending data in the packet that carries the ID to the MN according to the binding relationship of the MN;

wherein the method further comprises:

receiving, by the first MMA, an Internet Protocol (IP) address obtaining request sent by the MN;

allocating an IP address to the MN and obtaining identifier information of the MN according to the IP address obtaining request sent by the MN; wherein the identifier information is a random number generated according to the IP address and the identifier information indicates the MN ID, and binding the IP address of the MN to the identifier information according to the identifier information.

2. The MN communication method according to claim 1, wherein querying of the MN binding relationship according to the ID carried in the packet comprises:

by a second MMA adjacent to the CN, according to the ID carried in the packet, querying a third MMA which stores the MN binding relationship;

sending the packet to a fourth MMA corresponding to the MN binding relationship; and querying, by the fourth MMA corresponding to the MN binding relationship, the MN binding relationship according to the ID carried in the packet.

3. The MN communication method according to claim 2, wherein sending the data in the packet to the MN according to the MN binding relationship comprises:

obtaining, by the second MMA adjacent to the CN, the fourth MMA corresponding to the MN binding relationship; and sending, by the CN, the packet that carries the ID of the MN to the MN through the fourth MMA corresponding to the MN binding relationship.

4. The MN communication method according to claim 3, wherein sending the data in the packet that carries the ID to the MN according to the MN binding relationship comprises:

replacing the ID in the packet with the Internet Protocol (IP) address of the MN and forwarding the packet to the MN; or adding the IP address of the MN into the packet that carries the ID and forwarding the packet to the MN directly.

5. The MN communication method according to claim 1, wherein binding the IP address of the MN to the identifier information according to the identifier information comprises:

binding the identifier information to the IP address of the MN;

querying, by the first MMA, a binding relationship table according to the identifier information of the MN;

if the identifier information of the MN exists in the binding relationship table, refreshing the binding relationship table according to a binding relationship between the IP address and the identifier information of the MN; or if the identifier information of the MN does not exist in the binding relationship table, inserting the binding relationship between the IP address and the identifier information of the MN into the binding relationship table.

6. A Mobile Node (MN) communication method, comprising:

receiving, by a first Mobility Management Anchor (MMA) which is an adjacent node to a Corresponding Node (CN), a packet that carries an identifier (ID) of a Mobile Node (MN) from the CN, wherein identifier information is a random number generated according to an Internet Protocol (IP) address and the identifier information indicates the MN ID;

querying, by the first MMA adjacent to the CN, a second MMA according to the ID carried in the packet, wherein the second MMA stores an MN binding relationship;

sending, by the second MMA, the packet to the MN according to the MN binding relationship after receiving the packet;

wherein sending, by the second MMA, the packet to the MN according to the MN binding relationship after receiving the packet further comprises:

replacing the ID of the MN in the packet with the IP address of the MN, then sending the packet to the MN; or sending the packet to the MN by adding the IP address of the MN into the packet that carries the ID.

7. The MN communication method according to claim 6, wherein sending, by the second MMA, the packet to the MN according to the MN binding relationship after receiving the packet further comprises: sending, by the CN, the packet that carries the ID of the MN to the MN through the second MMA.

8. A Mobile Node (MN) communication method, comprising:

receiving, by a first Mobility Management Anchor (MMA), a packet that carries an identifier (ID) of an MN from a Corresponding Node (CN);

querying a binding relationship of the MN according to the ID carried in the packet; and sending data in the packet that carries the ID to the MN according to the binding relationship of the MN;

wherein querying the binding relationship of the MN according to the ID carried in the packet comprises:

by a second MMA adjacent to the CN, according to the ID carried in the packet, querying a third MMA which stores the MN binding relationship;

sending the packet to a fourth MMA corresponding to the MN binding relationship; and querying, by the fourth MMA corresponding to the MN binding relationship, the MN binding relationship according to the ID carried in the packet;

wherein sending data in the packet that carries the ID to the MN according to the MN binding relationship comprises:

obtaining, by the second MMA adjacent to the CN, the fourth MMA corresponding to the MN binding relationship; and sending, by the CN, the packet that carries the ID of the MN to the MN through the fourth MMA corresponding to the MN binding relationship.

9. The MN communication method according to claim 8, wherein sending the data in the packet that carries the ID to the MN according to the MN binding relationship comprises:

replacing the ID in the packet with an Internet Protocol (IP) address of the MN and forwarding the packet to the MN; or adding the IP address of the MN into the packet that carries the ID and forwarding the packet to the MN directly.

* * * * *